United States Patent [19]

Dunwell et al.

[11] Patent Number: 4,827,400
[45] Date of Patent: May 2, 1989

[54] SEGMENT DESCRIPTOR PRESENT BIT RECYCLE AND DETECT LOGIC FOR A MEMORY MANAGEMENT UNIT

[75] Inventors: Llewelyn S. Dunwell, Lynn; Richard P. Brown, Acton; Arthur Peters, Sudbury; John L. Curley, North Andover, all of Mass.

[73] Assignee: Honeywell Bull Inc., Minneapolis, Minn.

[21] Appl. No.: 848,513

[22] Filed: Apr. 7, 1986

[51] Int. Cl.⁴ .............................................. G06F 12/08
[52] U.S. Cl. .................................................... 364/200
[58] Field of Search ... 364/200 MS File, 900 MS File

[56] References Cited

U.S. PATENT DOCUMENTS

| | | |
|---|---|---|
| 4,096,568 | 6/1978 | Bennett et al. ........................ 364/200 |
| 4,394,725 | 7/1983 | Bienvenu et al. ..................... 364/200 |
| 4,442,484 | 4/1984 | Childs, Jr. et al. .................. 364/200 |
| 4,484,273 | 11/1984 | Stiffler et al. ....................... 364/200 |
| 4,488,256 | 12/1984 | Zolnowsky et al. .................. 364/900 |
| 4,525,778 | 6/1985 | Cane ..................................... 364/200 |

*Primary Examiner*—Archie E. Williams, Jr.
*Assistant Examiner*—Florin Munteanu
*Attorney, Agent, or Firm*—George Grayson; John S. Solakian

[57] ABSTRACT

A data processing system includes a logical address to a physical address translator in an extended memory management unit. A 128 word memory stores task segment descriptor words which include a base address. A 16 word memory stores corresponding present bits to indicate if the addressed task segment descriptor is present in its memory. This arrangement allows a 128 word memory to be cleared in 16 memory cycles.

6 Claims, 2 Drawing Sheets

SEGMENT DESCRIPTOR PRESENT BIT RECYCLE AND DETECT LOGIC FOR A MEMORY MANAGEMENT UNIT

BACKGROUND OF THE INVENTION

1. Field of the Invention

This invention relates generally to the field of data processing systems and more specifically to the case of a small memory to indicate if corresponding words in a large memory are present.

2. Description of the Prior Art

Data processing systems may organize the information stored in main memory in a number of segments. As the system processes a program containing a number of routines, new segments replace the previous segments as new information is brought into main memory. The programmer writes the software using logical addresses. The operating system stores this program information in physical addresses in main memory. The operating system also develops a translation table which indicates the starting physical address for each segment. As new segments replace previous segments, the information in the translation table changes since the operating system usually fits segments in main memory wherever the segment fits.

Prior art systems stored a relatively small number of segments in main memory. Therefore, rewriting the translation table took a small number of cycles. However, as new data processing systems were developed, the number of segments written in main memory increased with the subsequent increase in the number of cycles required for rewriting the translation table.

Data processing systems using cache memories have a similar problem in that it takes many memory cycles to rewrite a cache memory. These systems use a validity bit to indicate the presence of valid information in an addressed location. However, these systems store the validity bit for each addressed location in cache.

Information is deleted from cache by deleting the validity bit. This system is useful when a block or a number of blocks of information are deleted from cache.

OBJECTS OF THE INVENTION

Accordingly, it is a primary object of the invention to have an improved data processing system.

It is an object of the invention to have an improved memory management unit in the data processing system.

It is another object of the invention to have a memory management unit with improved apparatus for updating a task segment descriptor translation table.

It is yet another object of the invention to provide apparatus for clearing the task segment descriptor translation table by using fewer cycles.

It is still another object of the invention to provide improved apparatus means for writing and updating the translation table by the use of a small memory.

SUMMARY OF THE INVENTION

A main memory has its information organized in segments. Each segment is organized in a number of blocks. The software is written using logical addresses whereas the information in main memory is stored in physical addresses.

An extended memory management unit (EMMU) includes a 128 word by 32-bit segment descriptor random access memory for storing a task segment descriptor for each segment of main memory. The task segment descriptor includes a base address and the number of blocks in the main memory segment.

The EMMU also includes a 16 word by 8-bit present bit RAM which has a corresponding bit position for each task segment descriptor word location. Each time a task segment descriptor word location is addressed, the corresponding present bit is read out and tested.

A binary ONE present bit indicates that the task segment descriptor is present in the RAM. A binary ZERO present bit indicates that the task segment descriptor is not present in the RAM. If the addressed segment descriptor is not present, then a MMURDE signal sets up conditions enabling the segment descriptor to be fetched from main memory. The required task segment descriptor is transferred to the EMMU via the Local Bus Interface (LBI) and the corresponding present bit is set to binary ONE, indicating that its task segment descriptor is present in its RAM word location.

The 128 word RAM is considered cleared when all of the bits of the 16 word RAM are set to binary ZERO. Therefore, clearing the 128 word task segment descriptors takes only 16 cycles, the cycles necessary to clear the present bit RAM.

A single bit in the present bit RAM is updated by recycling an 8-bit word through a register and negative OR logic. A decoder output representing the bit to be updated sends the selected signal to the negative OR logic which in turn applies the 7 recycled signals and the updated selected signal to the present bit RAM to be written back into the word location from which it came.

Each time the task segment descriptor RAM is addressed, the corresponding present bit is selected by a multiplexer and sets a flop to generate signal MMURDE if the task segment descriptor is not present.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
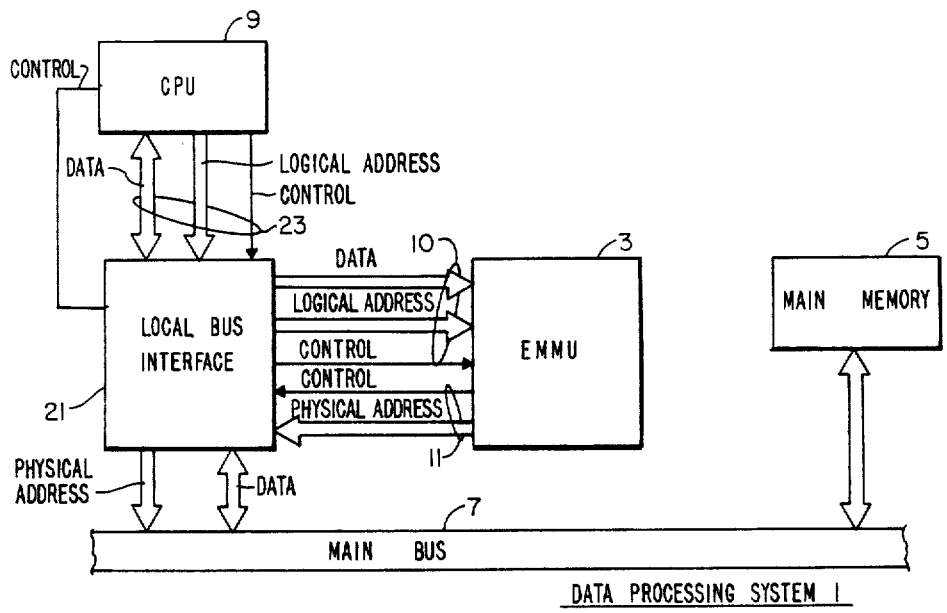
FIG. 1 shows a block diagram of the parts of the data processing system associated with the invention.

FIG. 1 shows a block diagram of a portion of the overall data processing system 1. System 1 includes a central processing unit (CPU) 9, local bus interface (LBI) 21 and a main memory 5. Both the LBI 21 and main memory 5 are coupled to a main bus 7. An extended memory management unit (EMMU) 3 is coupled to LBI 21 by a logical address bus 10 and a physical address bus 11.

The CPU 9 is coupled to the LBI 21 via a bus 23 which includes a databus, a logical address bus and control signals. The EMMU 3 receives logical address signals and data signals over bus 10 as well as a number of control signals and generates physical address signals and a number of control signals. The EMMU 3 basically acts as a logical to physical address translator. The CPU 9 receives program information from main memory 5 via LBI 21. The program information includes logical main memory addresses. The logical main memory addresses are not the actual main memory addresses, but rather the addresses that the programmer assigned to the instructions. The operating system assigns the program to a particular segment in memory at physical addresses. The EMMU 3 stores task segment descriptors which include a base address which is the physical address of the first word stored in the segment. The segment is made up of a number of blocks with a maximum of 256 blocks each having 256 words. Main memory 5 may be organized in up to 128 task segments, the first word of each segment being identified by the task segment descriptor stored in the EMMU 3.

During normal operations, the CPU 9 sends a logical address and the necessary control signals over bus 23 to the LBI 21 which in turn sends these signals to the EMMU 3 via bus 10. The EMMU 3 sends the task segment descriptor to create a physical address which is sent back to the LBI 21. The physical address is the base address of the segment. The CPU 9 may cause an offset to be added by the EMMU 3 to the base address to identify a particular word in the segment. This logic is not a part of the invention and is therefore not shown in the drawings.

Figure 2:
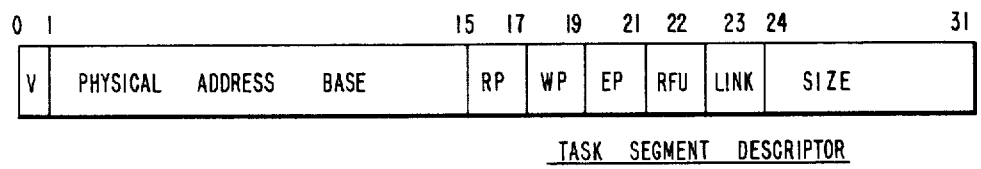
FIG. 2 shows the contents of a task segment descriptor word.

FIG. 2 shows the contents of the task segment descriptor. Included are a validity bit V, a 15-bit base address, a 2-bit read protect field (RP), a 2-bit write protect field (WP), a 2-bit execute protect field (EP), a 1-bit link field, and an 8-bit size field. The validity bit indicates that the task segment descriptor is valid and may be used. The RP, WP and EP fields indicate the level of protection of the segment. The link bit is used to tie another task segment descriptor to the addressed task segment descriptor. The size field gives the number of blocks in the addressed main memory 5 segment.

Figure 3:
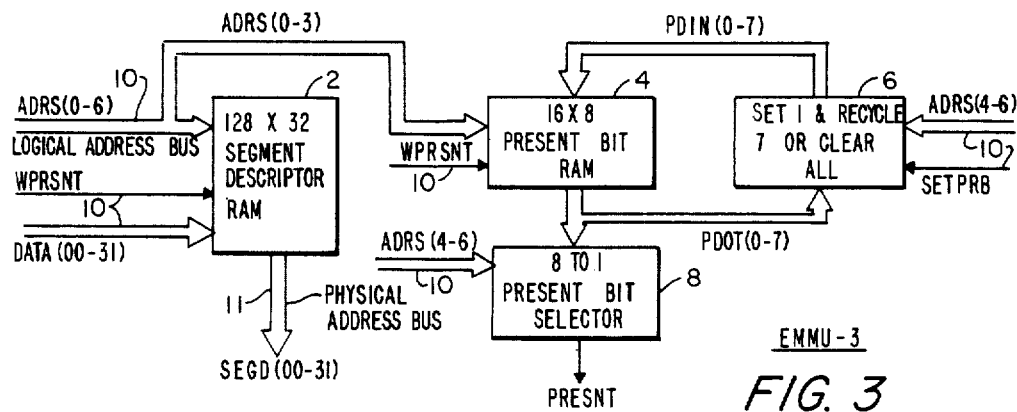
FIG. 3 shows a block diagram of a portion of the extended memory management unit.

FIG. 3 shows a number of logic blocks in the EMMU 3 that are involved in the "present bit" operation.

Up to 128 task segment descriptors of 32-bits each are stored in segment descriptor random access memory (RAM) 2 via 32 data signals DATA (00-31) of bus 10, which is addressed by seven logical address signals ADRS0 through ADRS6 via bus 10. The physical address created from the task segment descriptor is sent out over bus 11 as thirty-two signals SEGD (00-31).

A present bit RAM 4 includes 16 address locations of 8 bits each. Each present bit is identified with an address location in RAM 2. Note that RAM 2 has 128 address locations and RAM 4 stores 16×8 or 128 present bits.

A binary ONE bit stored in a bit location of RAM 4 indicates that a task segment descriptor is present in a corresponding location of RAM 2. A binary ZERO present bit stored in the bit location of RAM 4 indicates that a task segment descriptor is not present in a corresponding location of RAM 2.

An 8 to 1 present bit selector 8 receives the 8-bit word from RAM 4 and selects the present bit associated with the address location of RAM 2. The seven address signals ADRS0 through ADRS6 from address bus 10 select 1 of 128 address locations of RAM 2. The same address signals ADRS0 through ADRS6 select the corresponding present bit in two stages. The four address signals ADRS0 through ADRS3 from address bus 10 select 1 of 16 address locations in RAM 4. The three address signals ARDS4 through ADRS6 from address bus 10 applied to selector 8 select 1 of 8 present bits to generator signal PRESNT.

Set 1 and recycle 7 or clear all logic 6 controls the updating of RAM 4. Logic 6 may rewrite a single bit location of RAM 4 or under control of the clear all signal SETPRB may clear all locations of RAM 4.

Note that it takes 16 memory cycles to clear RAM 4. This would indicate that all 128 locations of RAM 2 do not have a task segment descriptor present. If RAM 4 did not exist, it would take 128 memory cycles to clear RAM 2. This invention therefore saves approximately 128 minus 16 or 112 memory cycles every time the software calls for a different job at a different level of operation. Note that the CPU 9 has 64 levels of operation, one level operating at a time. The CPU 9 is constantly switching between levels, therefore constantly requiring updating of RAM 4.

Eight signals PDOT0 through PDOT7 are applied to selector 8 and logic 6. Selector 8 selects the addressed present bit and logic 6 writes a new present bit and rewrites the remaining 7 present bits via eight signals PDIN0 through PDIN7 applied to RAM 4.

The write signal WPRSNT applied to RAMS 2 and 4 enable the write operation.

Figure 4:
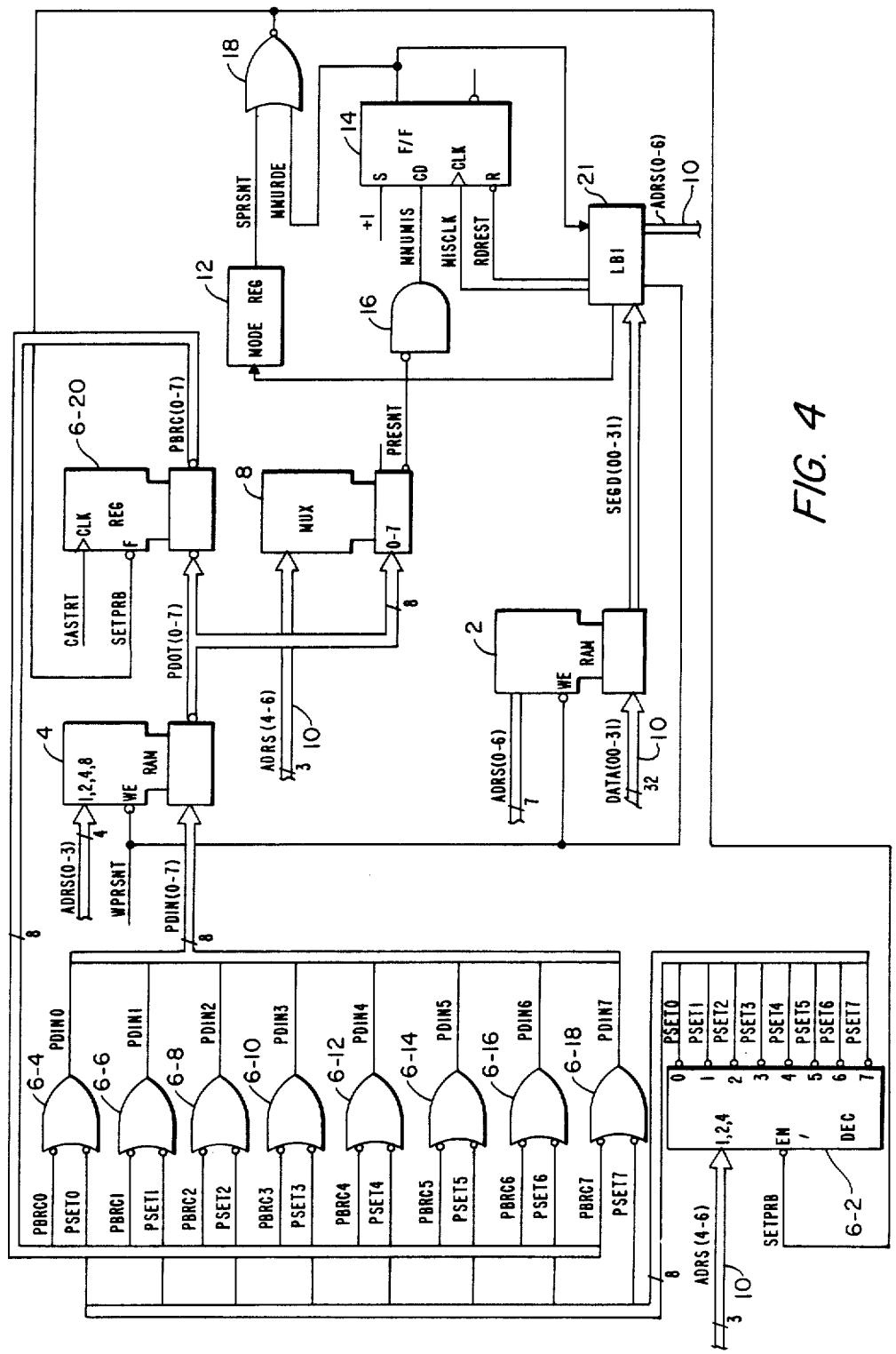
FIG. 4 shows a detailed logic diagram which includes the invention.

FIG. 4 shows the logic which is operative during the clear mode and during the detect, set and recycle modes.

The clear mode is initiated when signal SPRSNT from a mode register 12 is at binary ZERO and output signal MMURDE from a flop 14 is at binary ZERO. Signals SPRSNT and MMURDE at binary ZERO are applied to the inputs of a NOR gate 18 Output signal SETPRB at binary ONE disables a decoder 6-2 and a register 6-10. The mode register 12 is loaded by CPU 9.

The eight output signals PSET0 through PSET7 from decoder 6-2 at binary ONE (note the negated output) and the eight output signals from register 6-20, PBRC0 through PBRC7 at binary ONE, are applied to their respective inputs of eight negative OR gates 6-4 through 6-18. The respective output signals PDIN0 through PDIN7 at binary ZERO are applied to the input terminals of RAM 4. The write signal WPRSNT at binary ZERO enables the RAM 4 operation as the address signals ADRS0 through ADRS3 cycle through their 16 logic states 0000 through 1111 to address and write ZERO present bits in all 16 locations of RAM 4 thereby completing the clear mode operation.

During the detect, set and recycle modes, either signals SPRSNT or signal MMURDE is at logical ONE. This forces the NOR gate 18 output signals SETPRB to logical ZERO, thereby enabling decoder 6-2 and register 6-20. During the recycle mode, 7 present bits are recycled and the selected bit is stored back in RAM 4 at logical ONE. The present bit is set to logical ONE on the same memory cycle in which the task segment descriptor is written into its addressed location in RAM 2. Address signals ADRS0 through ADRS3 applied to RAM 4 select one of 16 address locations. The eight present bits appear as signals PDOT0 through PDOT7, which are applied to register 6-20 and stored on the rise of clock signal CASTRT. The register 6-20 output signals PBRC0 through PBRC7 are applied to the respective inputs of negative OR gates 6-4 through 6-18.

In this mode, however, decoder 6-2 is enabled and address signals ADR4 through ADR6 select one output signal. That output signal is at logical ZERO. Assume the "0" bit of the 8-bit word is selected by decoder 6-2. Then, signal PSET0 is at logical ZERO and signals PSET1 through PSET7 are at logical ONE. Therefore, output signal PDIN0 of negative OR gate 6-4 is at logical ONE and the output signals PDIN1 through PDIN7 reflect the state of the present bits stored in RAM 4 at the beginning of the cycle. That is, if present bit 1 is at logical ZERO, then signal PDOT1 is at logical ONE, signal PBRC1 is at logical ONE and signal PDIN1 is at logical ZERO which is written into the "1" bit position of the 8-bit addressed word. This indicates that the task segment descriptor is written into the corresponding location in RAM 2.

During the detect operation, a binary ONE stored in RAM 4 indicates that the current task segment descriptor is present in RAM 2. The entire present 8-bit word is applied to the input terminals of a multiplexer (MUX) 8. Address signals ADR4 through ADR6 select a binary ZERO signal (RAM 4 has an inverted output signal) and generates signal PRESNT at logical ONE. Flop 14 will not set on the rise of the MISCLK clock signal from CPU 9 through the LBI 21 since an output signal MMUMIS from negative AND gate 16 is at logical ZERO. Therefore, the flop 14 output signal MMURDE remains at logical ZERO.

If the present bit in RAM 14 were at logical ZERO indicating that the corresponding task segment descriptor was not present, then MUX 8 would generate signal PRESNT at logical ZERO. This would fore negative AND gate 16 output signal MMUMIS to logical ONE thereby setting flop 14 on the rise of clock signal MISCLK and forcing output signal MMURDE to logical ONE. Signal MMURDE applied to LBI 21 via bus 11 causes a stall of the system and the required task segment descriptor would be read into RAM 2. Since MMURDE is at logical ONE, register 6-20 and decoder 6-2 are enabled. This results in a binary ONE present bit being written into RAM 4 in a corresponding location to the location in RAM 2 into which the task segment descriptor is written during a recycle operation as described above.

Signal SPRSNT is used for diagnostic purposes to initiate an update of RAM 4 when new task segment descriptors are written into corresponding locations of RAM 2.

Signal MMURDE initiates an update when the task segment descriptor stored in RAM 2 is not present. Signal WPRSNT initiates a RAM 2 and a RAM 4 write operation whenever a task segment descriptor received by data signals DATA (00-31) is written into RAM 2 or initiates a RAM 4 word operation during the clear mode.

Clock signal MISCLK is generated by LBI 21 for every cycle during which a task segment descriptor is written into or read from RAM 2. Signal RDREST resets flop 14 after the new task descriptor is sent to RAM 2 by LBI 21 over the data bus 10.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system includes apparatus for translating logical addresses to physical addresses, said apparatus comprising:

main memory means for storing information organized in segments, said segments being stored in locations specified by said physical addresses;

central processing unit means for generating said logical addresses, each corresponding to one of said physical addresses;

memory management unit means coupled to said central processor means and including first memory means for storing segment descriptors in m locations specified by said logical addresses, and including second memory means for storing m bits in n locations specified by said logical addresses, each of said m bits indicating if a corresponding segment descriptor is stored in a location specified by a logical address, each of said descriptors including a physical address, said memory management unit further including means for clearing said second memory means in response to a clear signal from said central processor unit means and a sequence of n logical addresses from said central processor unit means to said second memory means;

said central processor unit means being coupled to said main memory means and said memory management unit means for receiving a physical address for transfer to said main memory means in response to a corresponding logical address if one of said m bits stored in one of said n locations specified by said logical address indicates that said segment descriptor including said physical address is stored in said first memory means wherein m is greater than n.

2. The apparatus of claim 1 wherein said memory management unit comprises:

said first memory means having m locations for storing each of said segment descriptors describing the location of the first word of each of said segments at locations specified by said logical addresses, each of said logical addresses having a first portion and a second portion; and said second memory means coupled to said first memory means and having said m bits stored in said n locations, said each of said m bits corresponding to one of said m locations in said first memory means, one of said m bits in a first state indicating that said corresponding segment descriptor is present in said first memory means, and said one of said m bits in a second state indicating that said corresponding segment descriptor is not present in said first memory means, said second memory means being responsive to said first portion of one of said logical addresses for generating a first m bit signal representative of said one of said m bits and m/n minus one first bit signals representative of the state of the respective remaining bits of a selected location.

3. The apparatus of claim 2 wherein said memory management unit further comprises:

multiplexer means coupled to said second memory means and responsive to said second portion of said logical address, for selecting said first m bit signal in a first state and generating a present signal in a first state indicating that said one of said segment descriptors is present in said first memory means, and selecting said first m bit signal in a second state and generating said present signal in a second state indicating that said corresponding segment descriptor is not present in said first memory means.

4. The apparatus of claim 3 wherein said memory management unit further comprises:

first register means coupled to said multiplexer means and responsive to said present signal in said second state for generating a first signal indicating that said one of said segment descriptors is not stored in said first memory means, said central processor unit means being responsive to said first signal for writing said one of said segment descriptors in said first memory means at said logical address location.

5. The apparatus of claim 4 wherein said memory management unit further comprises:

second register means coupled to said first register means for storing said first m bit signal and said m/n minus one first bit signals and responsive to said first signal for generating a second m bit signal and m/n minus one second bit signals respectively;

decoder means coupled to said first register means and responsive to said second portion of said one of said logical addresses and said first signal for generating a position signal in a second state corresponding to said second m bit signal and m/n minus one position signals each in a first state corresponding to said m/n minus one second bit signals respectively; and gating means coupled to said decoder means, said second register means and said second memory means and responsive to said second m bit signal in a second state and said position signal in said second state for generating a third m bit signal in a first state, and responsive to said m/n minus one position signals, each in said first state and corresponding ones of said m/n minus one second bit signals for generating m/n minus one third bit signals, said second memory means being responsive to said third m bit signal in said first state for writing said m bit in said first state, and responsive to said m/n minus one third bit signal for rewriting in their original state the respective remaining bits of said selected location.

6. The apparatus of claim 5 wherein m equals 128 and n equals 16 and m/n = 8.

* * * * *